United States Patent
Colantonio et al.

(10) Patent No.: US 8,668,163 B2
(45) Date of Patent: Mar. 11, 2014

(54) RACK AND PINION LANDING GEAR STEERING SYSTEM

(75) Inventors: David N. Colantonio, Dollard-des-Ormeaux (CA); Derek C. Milsom, Burlington (CA)

(73) Assignee: Goodrich Corporation, Charlotte, NC (US)

( * ) Notice: Subject to any disclaimer, the term of this patent is extended or adjusted under 35 U.S.C. 154(b) by 404 days.

(21) Appl. No.: 13/040,340

(22) Filed: Mar. 4, 2011

(65) Prior Publication Data

US 2011/0215192 A1     Sep. 8, 2011

Related U.S. Application Data

(60) Provisional application No. 61/311,093, filed on Mar. 5, 2010.

(51) Int. Cl.
    *B64C 25/50*     (2006.01)

(52) U.S. Cl.
    USPC ............................................... 244/50

(58) Field of Classification Search
    USPC ....... 244/100 R, 102 R, 102 A, 50, 99.2, 99.3
    See application file for complete search history.

(56) References Cited

U.S. PATENT DOCUMENTS

| | | | | | |
|---|---|---|---|---|---|
| 2,492,649 | A | * | 12/1949 | MacDuff | 244/50 |
| 2,712,422 | A | * | 7/1955 | Gerwig | 244/50 |
| 2,974,905 | A | * | 3/1961 | Rumsey | 244/50 |
| 2,988,056 | A | * | 6/1961 | Rumsey | 91/54 |
| 3,001,741 | A | * | 9/1961 | Rumsey | 244/50 |
| 3,099,424 | A | * | 7/1963 | Hrusch | 244/50 |
| 3,401,577 | A | * | 9/1968 | Partridge | 74/498 |
| 3,643,898 | A |   | 2/1972 | Whitener et al. | |
| 3,753,540 | A | * | 8/1973 | Renner | 244/50 |
| 3,986,475 | A | * | 10/1976 | Heiser | 114/144 R |
| 4,610,411 | A | * | 9/1986 | Veaux et al. | 244/50 |
| 5,242,131 | A |   | 9/1993 | Watts | |
| 5,595,359 | A |   | 1/1997 | Meneghetti | |
| 5,613,651 | A |   | 3/1997 | Meneghetti | |

(Continued)

FOREIGN PATENT DOCUMENTS

| | | | | | |
|---|---|---|---|---|---|
| GB | | 2161123 A | * | 1/1986 | ............. B64C 25/50 |
| WO | WO 2006071262 A1 | | * | 7/2006 | ............. B64C 25/34 |

OTHER PUBLICATIONS

Currey, Norman; Aircraft Landing Gear Design: Principles and Practices; 1988; American Institute of Aeronautics and Astronautics, Inc.; Fourth Edition; pp. 197-217.*

*Primary Examiner* — Tien Dinh
*Assistant Examiner* — Michael A Fabula
(74) *Attorney, Agent, or Firm* — Snell & Wilmer L.L.P.

(57) ABSTRACT

A steering system for aircraft landing gear can be used, for example, for controlling one or more axles of a bogie style landing gear system, such as, but not limited to, a six-wheel bogie style landing gear system. The steering system includes a rack having a plurality of rack teeth. An actuator is operatively connected to move the rack in a linear direction. A pinion has a plurality of pinion teeth in meshing engagement with the rack teeth. The pinion includes a pinion body extending between the pinion teeth and a pinion pivot that is spaced apart from the pinion teeth. The actuator, rack, and pinion are configured and adapted so that linear motion of the rack imparted by the actuator results in rotation of the pinion about the pinion pivot for steering landing gear wheels.

19 Claims, 8 Drawing Sheets

(56) References Cited

U.S. PATENT DOCUMENTS

| | | |
|---|---|---|
| 5,743,491 A | 4/1998 | Meneghetti |
| 6,123,292 A | 9/2000 | Ralph |
| 6,805,320 B2 | 10/2004 | Derrien et al. |
| 8,136,754 B2 * | 3/2012 | De Ruffray et al. ............ 244/50 |
| 2010/0078517 A1 | 4/2010 | Coles et al. |

* cited by examiner

RACK AND PINION LANDING GEAR STEERING SYSTEM

CROSS-REFERENCE TO RELATED APPLICATIONS

This application claims priority to U.S. Provisional Patent Application No. 61/311,093, filed Mar. 5, 2010, which is incorporated by reference herein in its entirety.

BACKGROUND OF THE INVENTION

1. Field of the Invention

The present invention relates to steering systems for aircraft landing gear, and more particularly to steering systems for landing gear having bogie beams with multiple axles, such as landing gear with three axles and six wheels per bogie beam.

2. Description of Related Art

Landing gear for large aircraft have traditionally employed a telescoping shock-absorbing strut with a multi-wheel truck attached. U.S. Pat. No. 6,805,320 to Derrien et al. discloses a large aircraft landing gear structure having a bogie or rocker beam with three axles for at total of six wheels. A stated objective of such landing gear structure is to provide a connection structure suitable for effectively handling the twisting moments that are generated while the aircraft is turning during taxiing.

In order to assist in turning the aircraft, reduce side loads acting upon landing gear during turns, and reduce tire scrubbing, traditional main landing gears with six wheeled bogie beam configurations have required the aft axle to be steerable relative to the bogie beam. Most common approaches to provide for aft axle steering have utilized hydraulic actuators connected to directly or indirectly push or pull the aft axle to the desired steering angle.

Traditional push-pull steering systems must be sized to produce enough steering torque at the minimum moment arm within the steeling range. As a result, the available steering torque is higher than required for most of the steerable range.

Steering angle feedback in traditional landing gear steering systems is measured with an LVDT (linear variable differential transformer) mounted inside a steering actuator. When a push-pull steering actuator is mounted between a bogie beam and an axle and when the orientation of the LVDT axis is similar to that of the bogie beam axis, deflections in the bogie beam itself are recorded as LVDT movement, resulting in false steering movement signals.

Such conventional methods and systems have generally been considered satisfactory for their intended purpose. However, there is still a need in the art for a landing gear steering system that allows for improved size and weight compared to traditional push-pull steering systems, while still meeting axle torque requirements. There also remains a need in the art for such steering systems that provide improved steering angle feedback. The present invention provides a solution for these problems.

SUMMARY OF THE INVENTION

The subject invention is directed to a new and useful steering system for aircraft landing gear. The steering system can be used, for example, for controlling one or more axles of a bogie style landing gear system, such as, but not limited to, a six-wheel bogie style landing gear system. The steering system includes a rack having a plurality of rack teeth. An actuator is operatively connected to move the rack in a linear direction. A pinion has a plurality of pinion teeth in meshing engagement with the rack teeth. The pinion includes a pinion body extending between the pinion teeth and a pinion pivot that is spaced apart from the pinion teeth. The actuator, rack, and pinion are configured and adapted so that linear motion of the rack imparted by the actuator results in rotation of the pinion about the pinion pivot for steering landing gear wheels.

In accordance with certain embodiments, the steering system includes a sensor, for example, a linear variable displacement transducer, for detecting an amount of travel of the rack in the linear direction. The sensor can be mounted proximate the actuator. It is also contemplated that the steering system can include a sensor for detecting an amount of rotation of the pinion.

In certain embodiments, the actuator includes a stationary actuator housing and a moving member operative to move in a linear direction relative to the actuator housing, and the rack is configured to be selectively locked against motion relative to the actuator housing. The actuator housing can be mounted to a bogie beam. A lock actuator can be mounted to the actuator housing, and can be configured to lock the pinion and a pivotally mounted axle relative to a bogie beam to prevent pivoting of the pivotally mounted axle. The lock actuator can be configured to selectively engage a locking mechanism with the rack to lock the rack against motion relative to the actuator housing. The rack can include a recess for receiving the locking mechanism to lock the rack. The locking mechanism can be biased toward engagement with the recess of the rack. The locking mechanism can be mounted for motion in a direction substantially perpendicular or parallel to the pinion pivot, or in any other suitable direction.

In accordance with certain embodiments, the actuator is configured to be energized by an aircraft power system. The actuator can include two hydraulic piston heads, each mounted to an opposite end of the rack. Each hydraulic piston head can be configured to impart linear motion onto the rack relative to a bogie beam in response to hydraulic pressure applied to the hydraulic piston heads.

It is contemplated that a bogie beam can have a plurality of landing gear axles mounted thereto, wherein one of the axles is pivotally mounted to the bogey beam for landing gear steering. The actuator and pinion pivot can be mounted to the bogie beam. The pinion can include a lever arm extending away from the pinion pivot, wherein the lever arm is operatively connected or engaged to the pivotally mounted axle such that linear motion of the moving member of the actuator results in rotation of the lever arm about the pinion pivot to rotate the pivotally mounted axle relative to the bogie beam for landing gear steering. The pivotally mounted axle and the pinion can both be configured to pivot about a common axis of rotation in response to linear motion of the rack.

In certain embodiments, there are three axles mounted to the bogie beam, and the pivotally mounted axle is the aft most of the three axles. A lever arm of the pinion can extend aft from the pinion pivot, and the pivotally mounted axle can include an aft extending lever arm. The lever arms of the pinion and pivotally mounted axle can be operatively connected together by a pin member that is substantially parallel to a common axis of rotation of the pinion and pivotally mounted axle.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
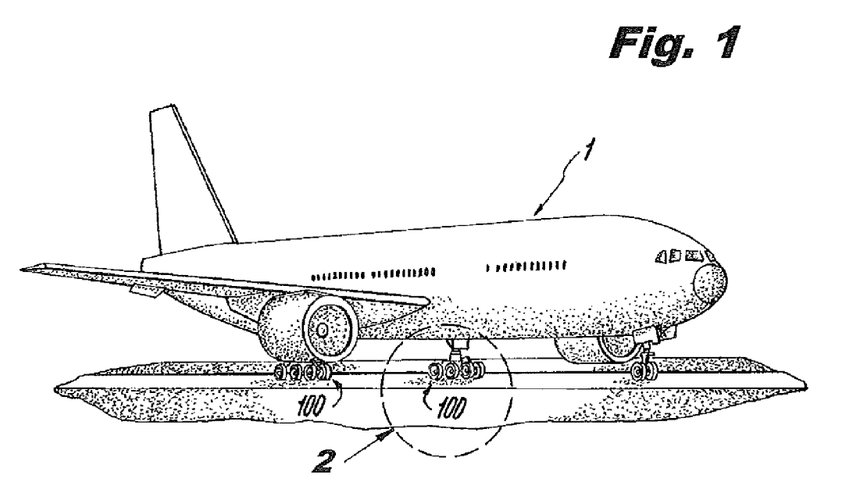
FIG. 1 is a perspective view of an exemplary embodiment of an aircraft having main landing gear with a steering system constructed in accordance with the present invention, showing the aircraft taxiing.
Figure 2:
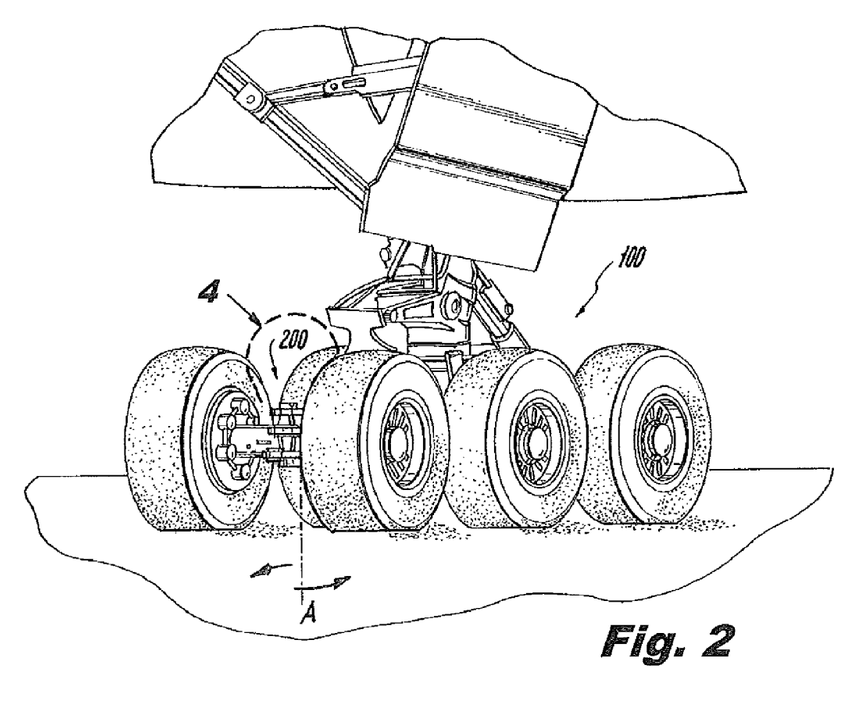
FIG. 2 is a perspective view of a portion of the aircraft of FIG. 1, showing one of the main landing gears.

Reference will now be made to the drawings wherein like reference numerals identify similar structural features or aspects of the subject invention. For purposes of explanation and illustration, and not limitation, a partial view of an exemplary embodiment of landing gear with a steering system in accordance with the invention is shown in FIG. 1 and is designated generally by reference character 100. Other embodiments of landing gear steering systems in accordance with the invention, or aspects thereof, are provided in FIGS. 2-5, as will be described. The systems and methods of the invention can be used for steering in aircraft landing gear, for example steering individual axles in main landing gear having multiple axles.

Referring now to FIG. 1, an aircraft 1 with main landing gear 100 is shown, wherein each main landing gear 100 includes a steering system constructed in accordance with the invention. A shown in greater detail in FIG. 2, landing gear 100 has a three-axle bogie beam configuration with six wheels. As indicated by arrows in FIG. 2, the aft axle is steerable by rotation thereof about axis A.

Figure 3:
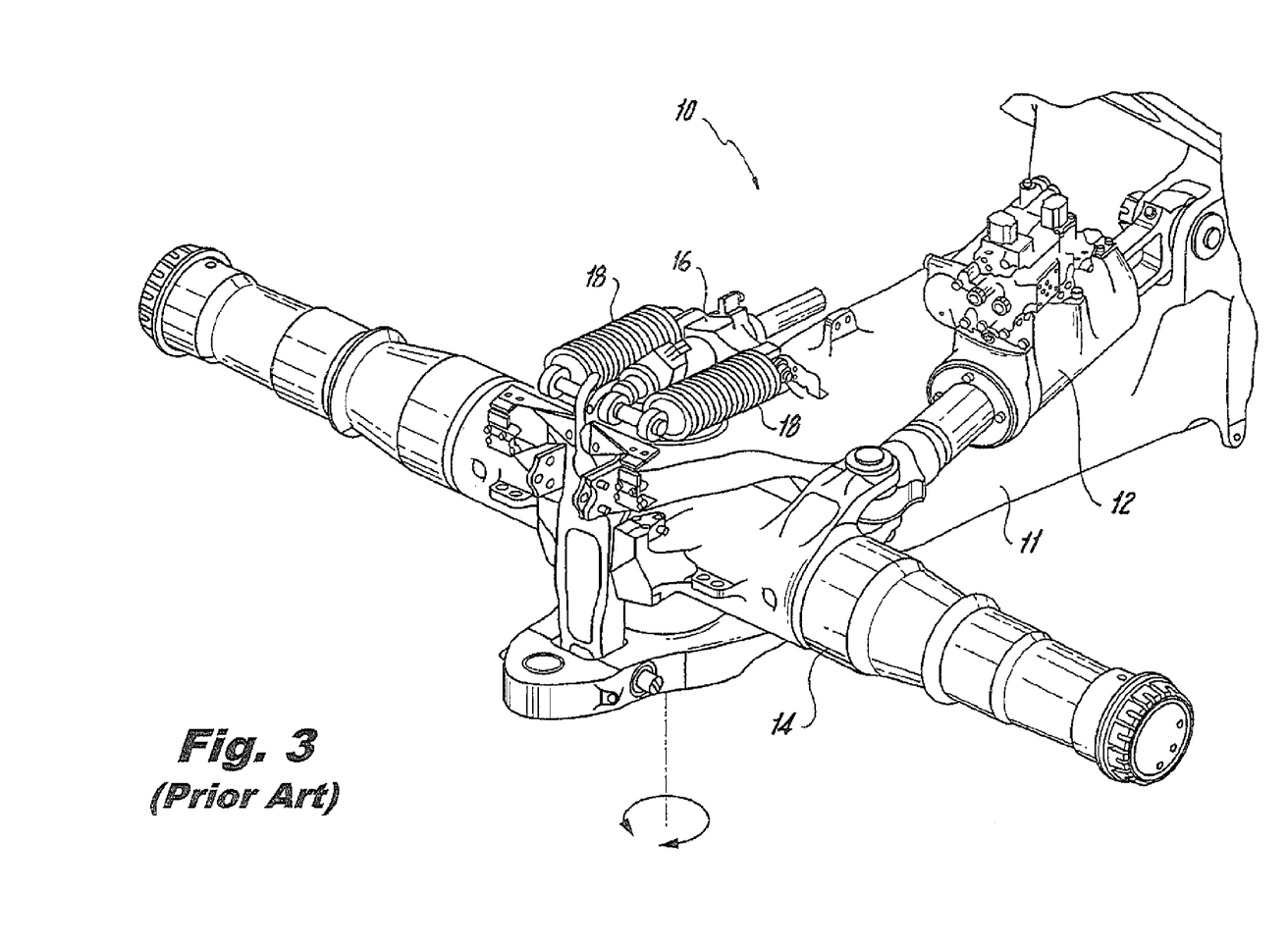
FIG. 3 is a perspective view of a portion of a prior art landing gear, showing the push-pull steering system connected between the bogie beam and the aft axle.

With reference to FIG. 3, a conventional steering system is shown for aircraft landing gear wheel bogies, particularly six-wheel bogie beam landing gear. The conventional system in FIG. 3 involves the use of hydraulic actuators to directly or indirectly push or pull the aft axle to a desired steering angle. FIG. 3 shows one type of traditional push-pull steering system 10 having a hydraulic actuator 12 coupled at one end to the bogie beam 11 and at the other end to an axle 14 for steering of axle 14 relative to bogie beam 11. Axle 14 can be steered by rotation thereof about the steering axis relative to bogie beam 11, as indicated by the circular arrows in FIG. 3. Bogie beam 11 includes two other axles forward of axle 14, but for sake of clarity only the aft portion of bogie beam 11 with axle 14 is shown. A lock actuator 16, which includes lock springs 18, is provided for locking axle 14 in a desired angle relative to a bogie beam 11 of the aircraft, more particularly, lock actuator 16 locks axle 14 in the centered position when steering of axle 14 is undesirable, such as during takeoff, landing, and when the landing gear are stowed during flight. Steering system 10 includes a linear variable displacement transducer (LVDT) located inside the hydraulic actuator 12 for providing actuator length readings used to determine the angle of the axle 14 relative to the bogie beam 11. The type of steering system shown in FIG. 3 is described in greater detail in U.S. Patent Application Publication No. 2010/0078517 to Coles, et al., which is incorporated by reference herein in its entirety.

Figure 4:
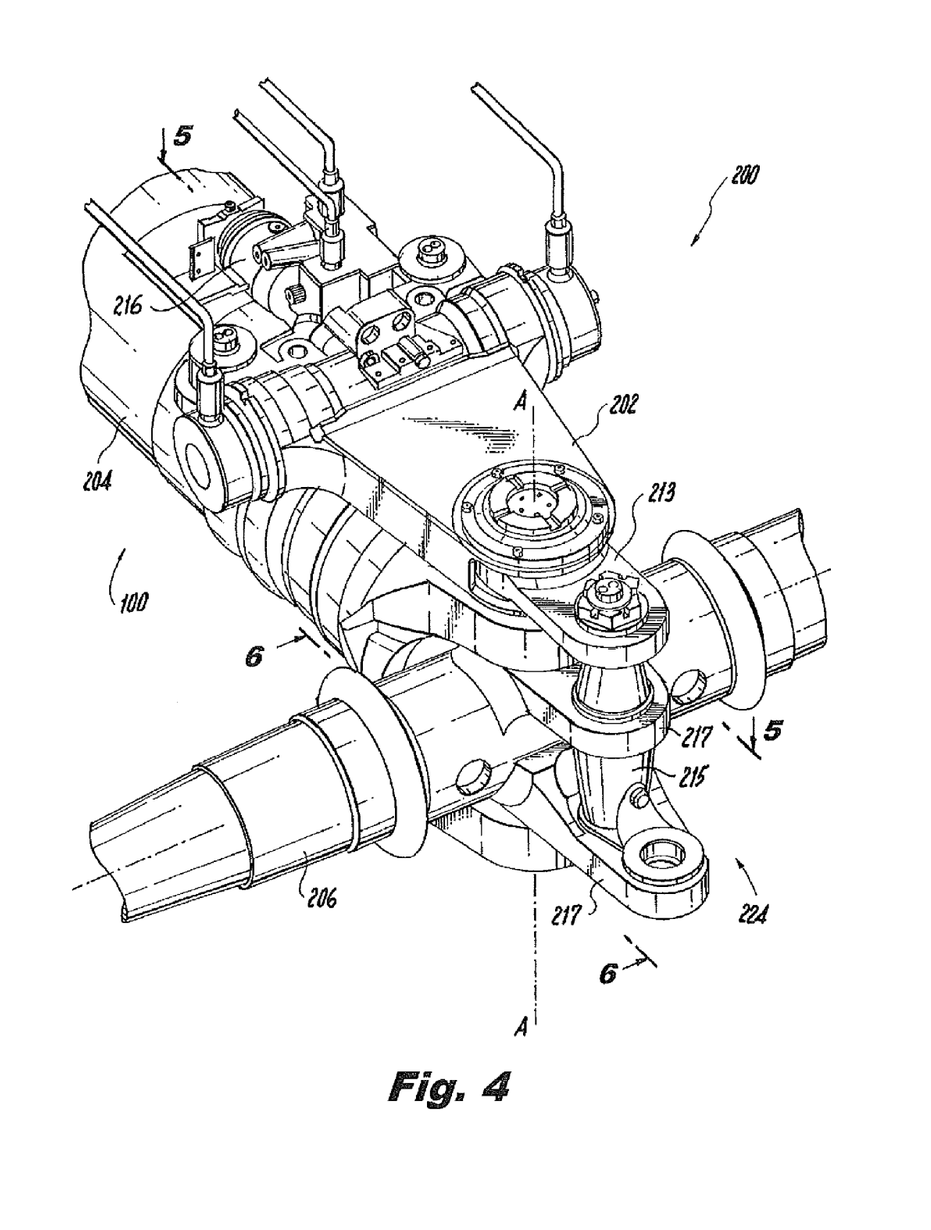
FIG. 4 is a perspective view of a portion of the landing gear of FIG. 2, showing the rack and pinion steering system constructed in accordance with an exemplary embodiment of the present invention connected to the bogie beam and the aft axle.
Figure 5:
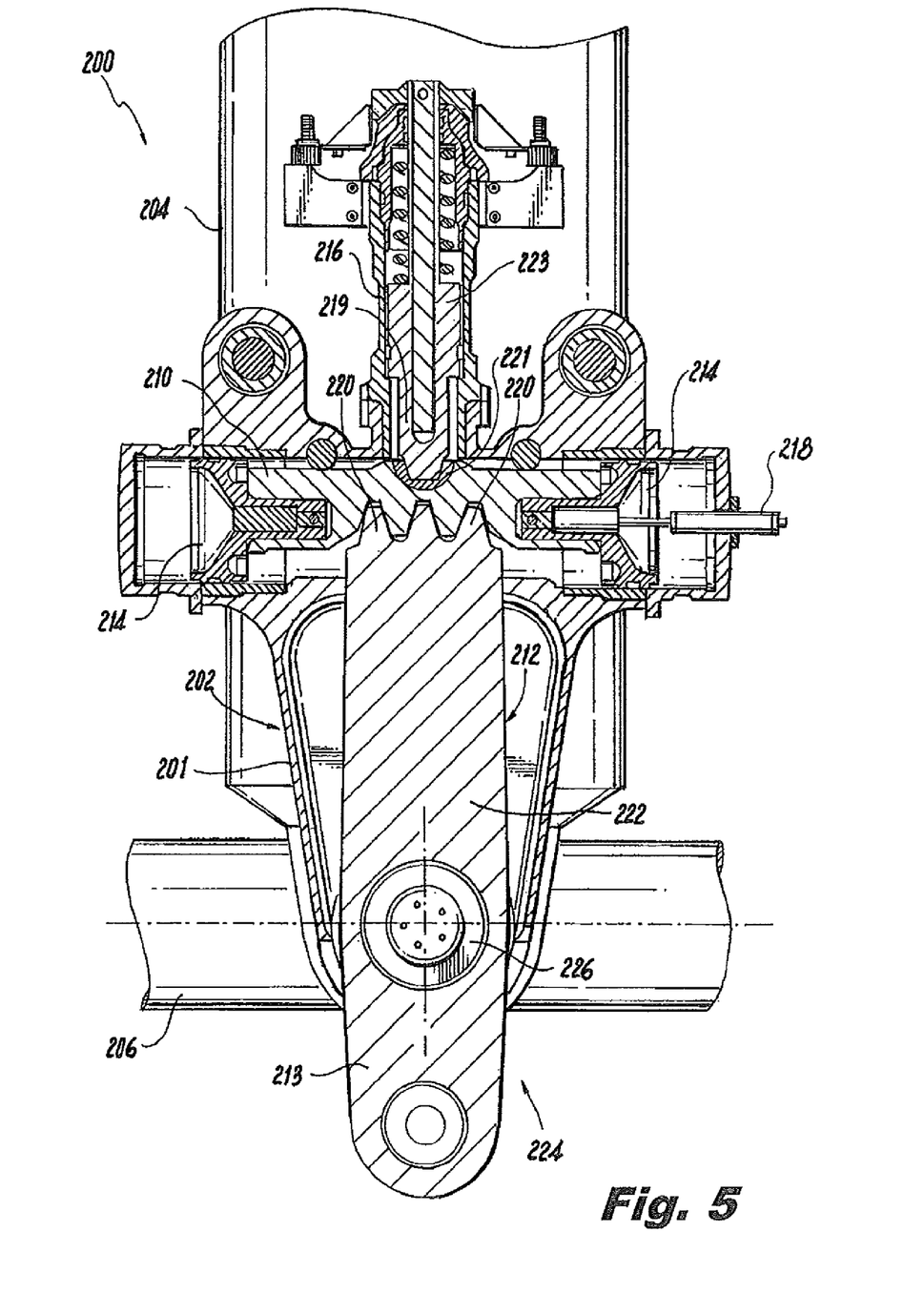
FIG. 5 is a cross-sectional plan view of the steering system of FIG. 4, showing the engagement of the teeth of the rack and pinion with the aft axle centered and with the locking mechanism engaged to prevent movement of the rack.

Referring now to FIGS. 4-8, landing hear 100 in accordance with an exemplary embodiment of the subject invention is shown in greater detail. FIGS. 4 and 5 show a steering system having rack and pinion gears mounted on top of an aft axle of a bogie beam of a landing gear system for an aircraft. By way of example, the steering system may be configured for a main landing gear system having a six-wheeled bogie beam with a requirement to enable aft axle rotation for the purposes of assistance in the turning of the aircraft, reduction in side loads acting upon the landing gear during turning, and/or minimization of tire scrubbing of the steered axle.

Steering system 200 includes a rack and pinion device 202 mounted to a bogie beam 204 and operative to control steering of aft axle 206 of a landing gear 100. Referring specifically to FIG. 5, rack and pinion device 202 includes an actuator housing 201 mounted to bogie beam 204 to be stationary with respect thereto. Within housing 201, rack 210 has rack teeth in meshing engagement with the teeth 220 of pinion 212. Two opposed actuators in the form of hydraulic pistons 214 are mounted to rack 210 and are configured to urge rack 210 in a linear direction in response to hydraulic pressure applied thereto. In other words, rack 210 translates as a result of hydraulic pressure applied to piston heads of pistons 214, which together constitute a moving member of the actuator mounted to either end of rack 210. Controlling the differential pressure applied to the two pistons 214 causes force imbalances to laterally move rack 210 for steering control. The engagement of gear teeth 220 on pinion 212 with the teeth of rack 210 translates the linear motion of rack 210 into rotational motion about a pivot pin 226 located in pinion body 222.

Figure 6:
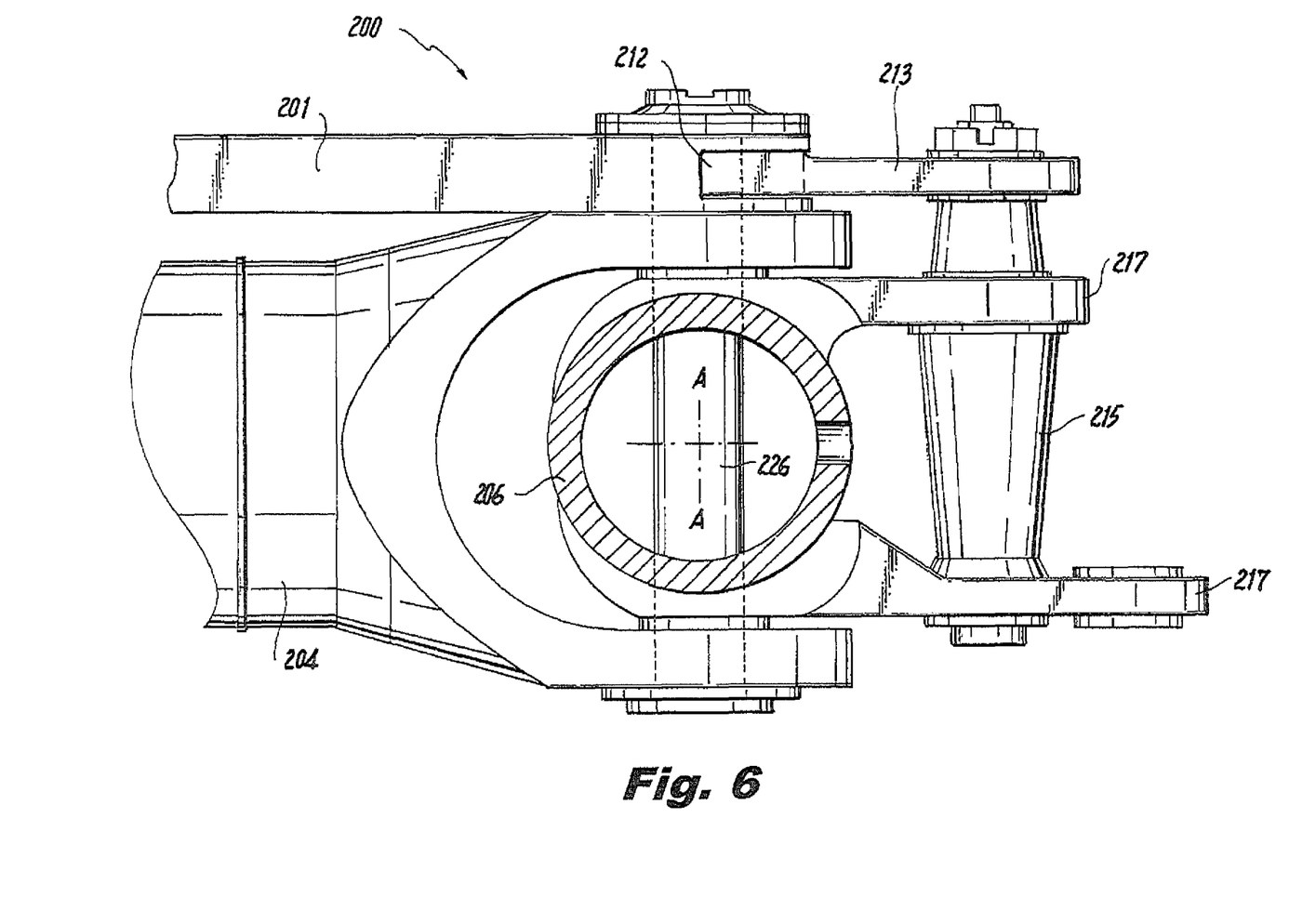
FIG. 6 is a side elevation view of a portion of the steering system of FIG. 4, showing the common axis of rotation of the pinion and the aft axle.

Referring again to FIG. 4, pinion 212 is connected to the axle 206 through an attachment region 224. Pinion 212 includes a lever arm 213, which is a portion of pinion 212 extending aft from where pinion 212 connects to pivot pin 226, shown in FIG. 5. A connection bolt or pin 215 connects lever arm 213 to corresponding lever arms 217 extending aft from aft axle 206. Pin 215 is parallel to the common axis A of rotation defined by pivot pin 226. This connection makes axle 206 rotate about the axis A of rotation defined by pivot pin 226 when pinion 212 rotates. FIG. 6 shows a side elevation view of this connection between lever arm 213, pin 215, and lever arms 217 of axle 206 for rotation of pinion 212 and axle 206 about the common axis of rotation, namely axis A, defined by pivot pin 226. While shown and described in the exemplary context of using a single connection bolt or pin, those skilled in the art will readily appreciate that multiple connection bolts or pins can be used to make the connection between a pinion and aft axle without departing from the spirit and scope of the invention.

With reference now to FIG. 5, a linear variable displacement transducer (LVDT) 218 is mounted in housing 201 proximate the piston head of one of the pistons 214 proximate rack 210 for detecting the amount of movement of rack 210 in the linear direction. Resulting signals indicative of the linear travel of rack 210 can be correlated to axle rotation for positional feedback, for example, for steering control. Those skilled in the art will readily appreciate that the LVDT 218 of steering system 200 is exemplary, and that any other suitable type of sensor, such as a rotational variable displacement transducer (RVDT), can be used without departing from the spirit and scope of the invention. Moreover, it is also possible to include multiple sensors for redundancy, improved resolution, or the like.

Figure 7:
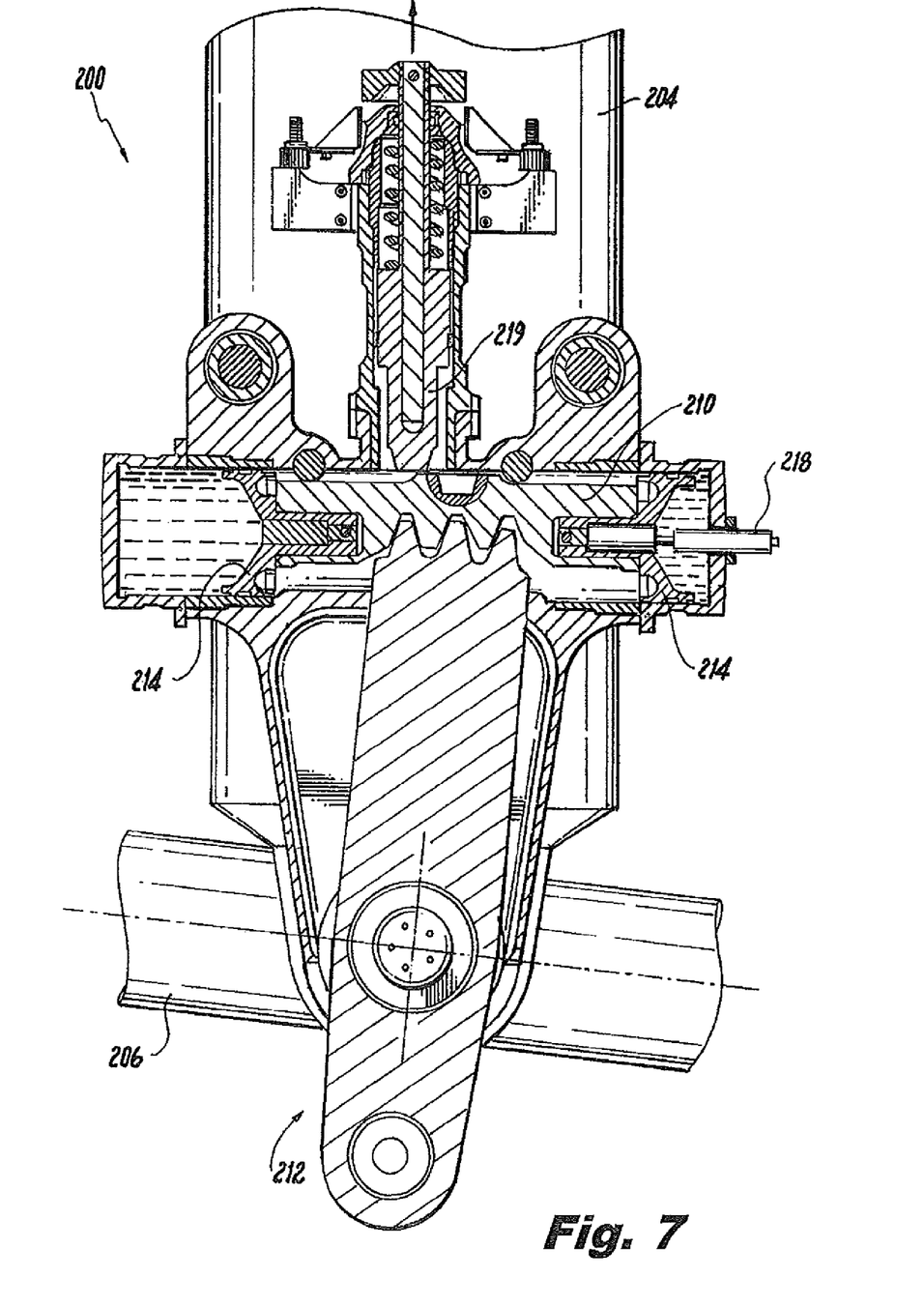
FIG. 7 is a cross-sectional plan view of the steering system of FIG. 5, showing the locking mechanism disengaged from the rack, with the aft axle rotated clockwise from the neutral position shown in FIG. 5.
Figure 8:
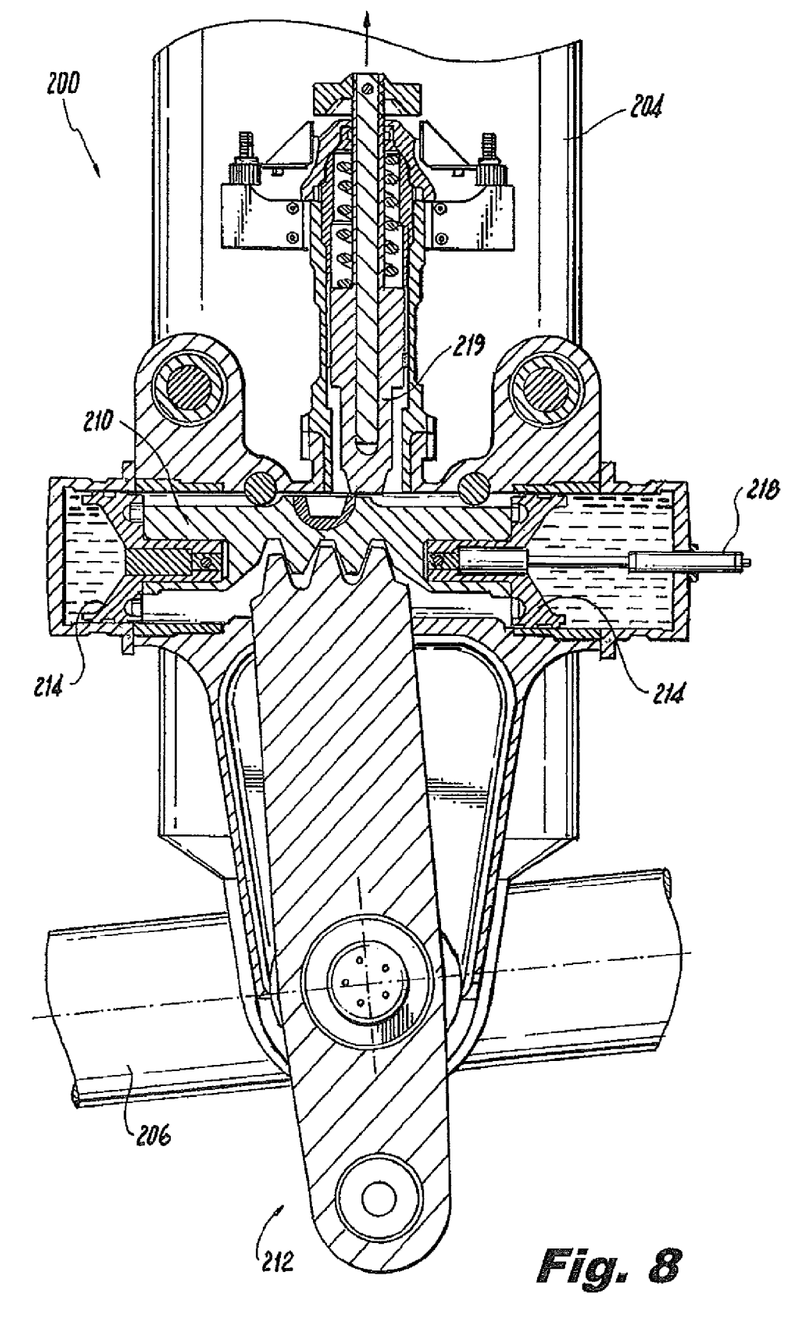
FIG. 8 is a cross-sectional plan view of the steering system of FIG. 5, showing the locking mechanism disengaged from the rack, with the aft axle rotated counter-clockwise from neutral position shown in FIG. 5.

A locking device 216 is mounted to actuator housing 201 and operates to engage a locking mechanism 219 with rack 210 when axle 206 is at a zero steering angle (i.e., neutral steering position). The locking device 216 prevents the axle 206 from rotation when steering is not desired, or stated otherwise, maintains the axle at the zero degree steering angle during takeoff, landing, and any other time when it is desirable to prevent movement of axle 206 relative to bogie beam 204. Translation of rack 210 can be prevented in the zero degree state by insertion of locking mechanism 219 into a detent or recess 221 in rack 210. Locking mechanism 219 is in the form of a plunger or pin on the end of a piston 223 that is hydraulically actuated to move locking mechanism 219. Piston 223 is a spring loaded piston requiring hydraulic pressure to move the piston against the spring bias to the unlocked position allowing the rack 210 to translate. When hydraulic pressure to the locking piston is removed, it moves under the spring bias and engages the detent or recess 221 formed in rack 210, when rack 210 is returned to the centered state after steering, for example, and in turn locks the rack 210 in the zero degree or neutral state. This way, in the event of loss of hydraulic pressure the system defaults to lock rack 210 under the force of the spring bias. FIG. 5 shows rack 210 locked by engagement of locking mechanism 219 with axle 206 in the zero degree or neutral state. FIGS. 7 and 8 show locking mechanism 219 disengaged from rack 210 with axle 206 rotated with respect to bogie beam 204 in a clockwise and counter-clockwise direction, respectively, as viewed from above. FIGS. 7 and 8 also indicate schematically the hydraulic fluid acting on pistons 214 of the actuator for moving rack 210. Locking mechanism 219 moves in a direction perpendicular to axis A defined by pinion pivot 226 shown in FIGS. 4 and 6.

Figures 9, 10:
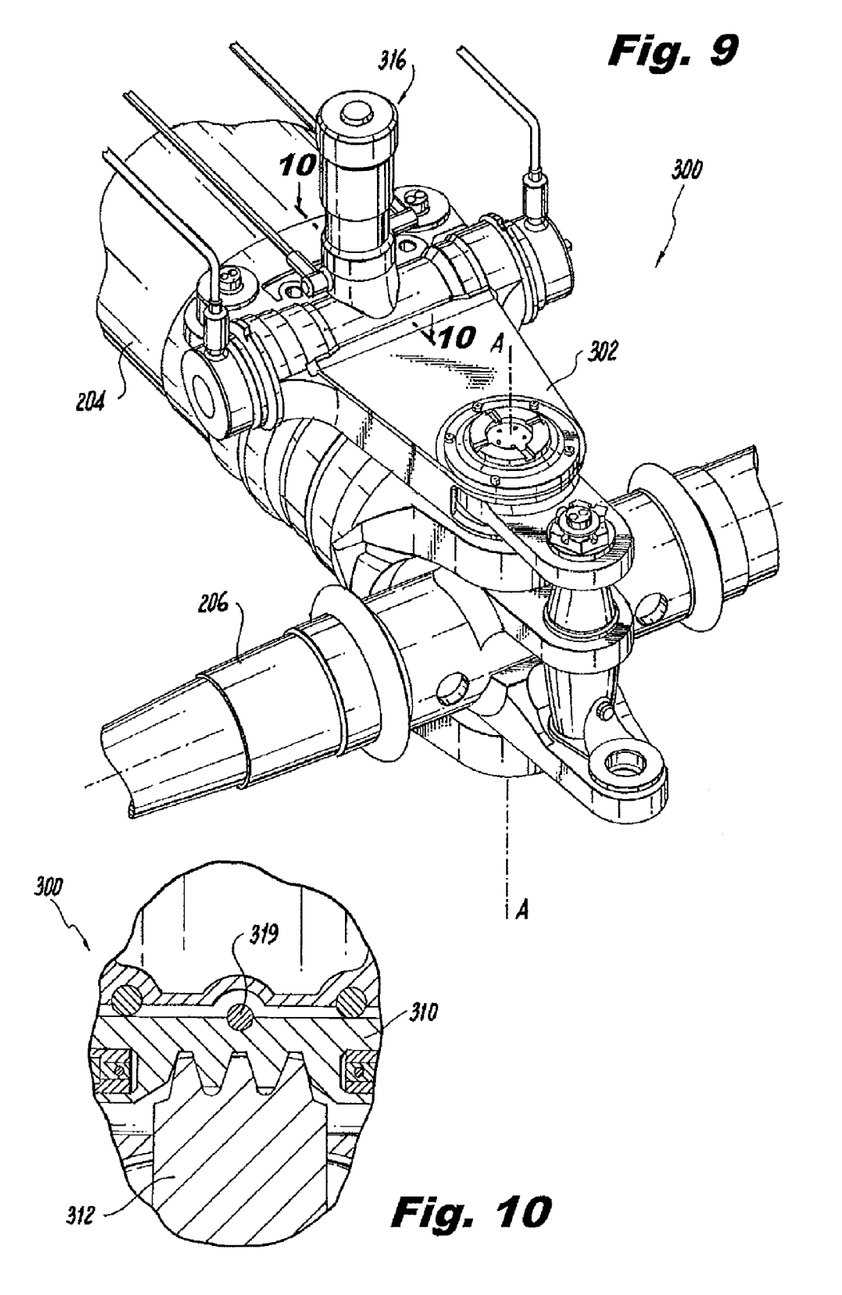
FIG. 9 is a perspective view of another exemplary embodiment of a steering system constructed in accordance with the present invention, showing a locking mechanism that is oriented for motion parallel to the common axis of rotation of the aft axle and pinion.
FIG. 10 is a cross-sectional plan view of a portion of the steering system of FIG. 9, showing the engagement of the locking mechanism with the rack.

With reference now to FIGS. 9 and 10, another exemplary embodiment of a steering system 300 constructed in accordance with the subject invention is shown, in which the locking mechanism moves in a direction parallel to the axis of the pinion pivot. Steering system 300 includes a rack and pinion device 302 much as described above with respect to steering system 200. Locking device 316 is similar to locking device 216 described above, but with the axis of its motion parallel with axis A. In other words, the motion of locking mechanism 319 of locking device 316 is vertical as oriented in FIG. 9. An end of locking mechanism 319, which is in the form of a pin extending from a hydraulic piston as described above with respect to locking mechanism 319, engages the recess or detent in rack 310 to lock the position of pinion 312 as shown in FIG. 10, and can be withdrawn upward (as oriented in FIG. 9) to clear rack 310 when unlocked.

It is also contemplated that in addition to or in lieu of the pin of locking mechanisms 219 and 319, a ball or other suitable attachment can be provided on a locking mechanism to be selectively engaged with the rack. While exemplary locking mechanisms are described above as having motion parallel or perpendicular to the axis of rotation of the axle, any other suitable orientation, including oblique orientations, can be used for locking mechanism motion as needed from application to application without departing from the spirit and scope of the invention. It is also contemplated that steering systems in accordance with the subject invention can also be configured without the locking devices without departing from the spirit and scope of the invention. This could be advantageous, for example, for weight and space savings in applications where the main steering actuator can be sized to react all of the identified operational loads and the control system can be designed to control the position throughout the operational spectrum with acceptable accuracy to prevent unwanted deviations of the steerable axle from the zero degree or neutral state.

The steering systems described above have been illustrated with the rack on the forward side of the aft axle, but those skilled in the art will readily appreciate that the rack could be mounted on other locations of any of the axles, including on the aft side of a steerable axle, and inboard or outboard of the bogie beam. The rack and pinion steering system may be employed to directly or indirectly rotate the aft, center or forward axle coupled to the bogie beam. Moreover, while described herein in the exemplary context of main landing gear with three axles, steering systems in accordance with the subject invention can be used with steering any axle on landing gear with any number of axles without departing from the spirit and scope of the invention.

While described above in an exemplary context of hydraulic actuation, those skilled in the art will readily appreciate that any other suitable type of actuation can be used. It is advantageous to utilize existing aircraft power systems, such as hydraulics or electrical power, to power or energize the steering system. For example, any variation of rotary hydromechanical actuation or electro-mechanical actuation, can be used for steering system actuation without departing from the spirit and scope of the invention.

It is believed that in certain applications there will be an overall landing gear weight decrease using the rack and pinion steering system described herein while fulfilling the same axle torque requirements as traditional push-pull steering systems. Rack and pinion steering systems as described above can be sized based on the required steering torque which is typically constant or uniform throughout the entire steering range. Traditional push-pull steering systems must be sized to produce enough steering torque at the minimum moment arm within the steering range. As a result, the available steering torque is always much higher than required for most of the steering range. The rack and pinion steering systems described herein overcome this drawback, allowing for savings in size and weight. The reduced size of steering systems in accordance with the invention allows steering systems to fit into smaller space envelopes compared to the traditional systems. This is particularly advantageous in applications where proximity to wheels and brakes is a concern.

Additional advantages of steering systems in accordance with the subject invention relate to sensors and steering feedback. Traditional steering angle feedback is provided by measurements taken with an LVDT mounted inside a steering actuator. When a push-pull steering actuator is mounted between a bogie beam and axle and the orientation of the LVDT axis is similar to that of the bogie beam axis, deflections in the bogie beam itself are recorded as LVDT movement resulting in false steering movement signals. Traditional systems employing RVDT sensors have similar accuracy issues at small angular deflections, such as when the steerable axle is near the centered position. The rack and pinion steering systems described herein will not experience the same faults since the LVDT is mounted perpendicular to the bogie beam axis.

The methods and systems of the present invention, as described above and shown in the drawings, provide for landing gear steering with superior properties including decreased size, decreased weight, and improved feedback. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A landing gear steering system comprising:
   a) a rack having a plurality of rack teeth;
   b) an actuator operatively connected to move the rack in a linear direction; and
   c) a pinion having a plurality of pinion teeth in meshing engagement with the rack teeth,
      wherein the pinion includes a pinion body extending between the pinion teeth and a pinion pivot that is spaced apart from the pinion teeth,
      wherein the actuator, the rack, and the pinion are configured and adapted so that linear motion of the rack imparted by the actuator results in rotation of the pinion about the pinion pivot which steers at least one landing gear wheel which is mounted on an axle,
      wherein a lever arm of the pinion extends aft from the pinion pivot,
      wherein the axle is pivotally mounted and includes an aft extending lever arm, and
      wherein the lever arms of the pinion and the pivotally mounted axle are operatively connected together by a pin member that is substantially parallel to a common axis of rotation of the pinion and the pivotally mounted axle.

2. The landing gear steering system as recited in claim 1, further comprising a sensor for detecting an amount of travel of the rack in the linear direction.

3. The landing gear steering system as recited in claim 2, wherein the sensor is a linear variable displacement transducer.

4. The landing gear steering system as recited in claim 2, wherein the sensor is mounted proximate the actuator.

5. The landing gear steering system as recited in claim 1, further comprising a sensor for detecting an amount of rotation of the pinion.

6. The landing gear steering system as recited in claim 1, wherein the actuator includes a stationary actuator housing and a moving member operative to move in a linear direction relative to the actuator housing, and wherein the rack is configured to be selectively locked against motion relative to the actuator housing.

7. The landing gear steering system as recited in claim 6, further comprising a lock actuator mounted to the actuator housing, wherein the lock actuator is configured to selectively engage a locking mechanism with the rack to lock the rack against motion relative to the actuator housing.

8. The landing gear steering system as recited in claim 7, wherein the rack includes a recess for receiving the locking mechanism to lock the rack against motion relative to the actuator housing.

9. The landing gear steering system as recited in claim 8, wherein the locking mechanism is biased toward engagement with the recess of the rack.

10. The landing gear steering system as recited in claim 9, wherein the locking mechanism is mounted for motion in a direction substantially perpendicular to the pinion pivot.

11. The landing gear steering system as recited in claim 9, wherein the locking mechanism is mounted for motion in a direction substantially parallel to the pinion pivot.

12. The landing gear steering system as recited in claim 1, wherein the pinion body includes a lever arm extending away from the pinion pivot for engaging a steerable landing gear axle.

13. The landing gear steering system as recited in claim 1, wherein the actuator is configured to be energized by an aircraft power system.

14. The landing gear steering system as recited in claim 1, wherein the actuator includes two hydraulic piston heads, each mounted to an opposite end of the rack, each hydraulic piston head being configured to impart linear motion onto the rack in response to hydraulic pressure applied to the hydraulic piston heads.

15. An aircraft landing gear steering system comprising:
   a) a bogie beam having a plurality of landing gear axles mounted thereto, wherein one of the axles is pivotally mounted to the bogey beam for landing gear steering;
   b) an actuator mounted to the bogie beam and having a moving member operative to move in a linear direction relative to the bogie beam;
   c) a rack having a plurality of rack teeth, and being mounted to the moving member of the actuator for linear motion relative to the bogie beam; and
   d) a pinion having a plurality of pinion teeth in meshing engagement with the rack teeth, wherein the pinion includes a pinion body extending between the pinion teeth and a pinion pivot mounted to the bogie beam, the pinion body including a lever arm extending away from the pinion pivot, wherein the lever arm is operatively connected to the pivotally mounted axle such that linear motion of the moving member of the actuator results in rotation of the lever arm about the pinion pivot to rotate the pivotally mounted axle relative to the bogie beam for landing gear steering, wherein the lever arm of the pinion extends aft from the pinion pivot, and wherein the pivotally mounted axle includes an aft extending lever arm, and wherein the lever arms of the pinion and the pivotally mounted axle are operatively together by a pin member that is substantially parallel to a common axis of rotation of the pinion and the pivotally mounted axle.

16. The landing gear steering system as recited in claim 15, wherein the pivotally mounted axle and the pinion are both configured to pivot about a common axis of rotation in response to linear motion of the rack.

17. The landing gear steering system as recited in claim 15, further comprising a locking mechanism configured to lock the pinion and pivotally mounted axle relative to a bogie beam to prevent pivoting of the pivotally mounted axle.

18. The landing gear steering system as recited in claim 15, wherein there are three axles mounted to the bogie beam, and wherein the pivotally mounted axle is aft most of the three axles.

19. The landing gear steering system as recited in claim 15, wherein the moving member of the actuator includes two hydraulic piston heads, each mounted to an opposite end of the rack from the other, each hydraulic piston head being configured to impart linear motion onto the rack relative to the bogie beam in response to hydraulic pressure applied to the hydraulic piston heads.

* * * * *